(12) United States Patent
He et al.

(10) Patent No.: US 12,271,082 B2
(45) Date of Patent: Apr. 8, 2025

(54) DISPLAY PANEL AND DISPLAY DEVICE

(71) Applicants: Mianyang HKC Optoelectronics Technology Co., Ltd., Mianyang (CN); HKC CORPORATION LIMITED, Shenzhen (CN)

(72) Inventors: Liu He, Mianyang (CN); Keming Yang, Mianyang (CN); Rong Tang, Mianyang (CN); Yizhen Xu, Mianyang (CN); Feng Jiang, Mianyang (CN); Baohong Kang, Mianyang (CN)

(73) Assignees: HKC CORPORATION LIMITED, Shenzhen (CN); MIANYANG HKC OPTOELECTRONICS TECHNOLOGY CO., LTD., Mianyang (CN)

( * ) Notice: Subject to any disclaimer, the term of this patent is extended or adjusted under 35 U.S.C. 154(b) by 0 days.

(21) Appl. No.: 18/631,032

(22) Filed: Apr. 9, 2024

(65) Prior Publication Data
US 2024/0255809 A1    Aug. 1, 2024

Related U.S. Application Data

(62) Division of application No. 18/087,833, filed on Dec. 23, 2022, now Pat. No. 11,988,923.

(30) Foreign Application Priority Data

Jun. 27, 2022    (CN) .......................... 202210737189.7

(51) Int. Cl.
*G02F 1/1341* (2006.01)
*G02F 1/133* (2006.01)
(Continued)

(52) U.S. Cl.
CPC ........ *G02F 1/1341* (2013.01); *G02F 1/13306* (2013.01); *G02F 1/133357* (2021.01); *G02F 1/1339* (2013.01)

(58) Field of Classification Search
CPC . G02F 1/133357; G02F 1/0107; G02F 1/1681
See application file for complete search history.

(56) References Cited

U.S. PATENT DOCUMENTS

2012/0099063 A1    4/2012    Hung et al.
2014/0292185 A1    10/2014    Moon et al.
(Continued)

FOREIGN PATENT DOCUMENTS

CN    1609688 A    4/2005
CN    1928672 A    3/2007
(Continued)

OTHER PUBLICATIONS

Liu, Yanmei, the ISA written comments, Mar. 2023, CN.
Liu, Yanmei, the International Search Report, Mar. 2023, CN.

*Primary Examiner* — Paul C Lee

(57) ABSTRACT

A display panel and a display device are disclosed. The display panel includes a first substrate, a second substrate, and a liquid crystal layer disposed therebetween. The first substrate includes a first base and a planarization layer disposed on a side of the first substrate adjacent to the liquid crystal layer. A side of the planarization layer adjacent to the liquid crystal layer includes a textured structure, which includes at least one groove path. The first substrate further includes a bottom edge. An extending direction of the at least one groove path forms an included angle with the bottom edge, the included angle being greater than or equal to 45 degrees and less than or equal to 135 degrees. A liquid crystal material in the liquid crystal layer diffuses along the (Continued)

extending direction of the groove path through the groove path based on capillary phenomenon.

8 Claims, 4 Drawing Sheets

(51) Int. Cl.
    *G02F 1/1333*     (2006.01)
    *G02F 1/1339*     (2006.01)

(56) References Cited

U.S. PATENT DOCUMENTS

2017/0168355 A1    6/2017    Lee et al.
2019/0033672 A1*    1/2019    Ohori ................. H01L 27/1248

FOREIGN PATENT DOCUMENTS

| CN | 101311798 | A | 11/2008 |
| --- | --- | --- | --- |
| CN | 201853031 | U | 6/2011 |
| CN | 105911774 | A | 8/2016 |
| CN | 110673403 | A | 1/2020 |
| CN | 110764317 | A | 2/2020 |
| CN | 115047663 | A | 9/2022 |
| TW | 201217868 | A | 5/2012 |

\* cited by examiner

DISPLAY PANEL AND DISPLAY DEVICE

CROSS-REFERENCE TO RELATED APPLICATIONS

This application is a division of U.S. patent application Ser. No. 18/087,833 filed Dec. 23, 2022, which is hereby incorporated by reference herein in its entirety.

TECHNICAL FIELD

This application relates to the field of display technology, and more particularly relates to a display panel and a display device.

BACKGROUND

The description provided in this section is intended for the mere purpose of providing background information related to the present application but doesn't necessarily constitute prior art.

With the progress of society and the development of science and technology, thin film transistor liquid crystal display (TFT-LCD) has become the mainstream product in the display field of today's era. It plays a vital role in industrial production and daily life, and is increasingly favored by people. A liquid crystal display panel generally includes an array substrate, a color filter substrate, a sealant, and a liquid crystal layer that is sealed into a cell formed by the array substrate, the color filter substrate, and the sealant. Under normal use environment, the liquid crystal display panel can exert excellent display effect and performance. However, the liquid crystal display panel also has some problems, such as an irregular cloud pattern (Mura) phenomenon of the liquid crystal display panel.

The Mura phenomenon of the liquid crystal display panel refers to the phenomenon that the brightness of the displayed image is uneven under the illumination of the same light source, resulting in various traces or marks. Among the various Muras, the gravitational Mura has an extremely high incidence. The fundamental reason is that when the liquid crystal display panel is placed vertically, under the action of high temperature, the liquid crystal cell expands and the cell thickness increases. Then due to its own gravity, the liquid crystal is distributed in the liquid crystal cell in the form of more on the lower side and less on the upper side, resulting in uneven brightness of the display panel. Therefore, its gravitational mura problem has become an urgent problem to be solved by those skilled in the art.

SUMMARY

In view of the above, it is a purpose of the present application to provide a display panel and a display device to solve the problem of gravitational mura when the display panel is placed vertically.

The present application discloses a display panel including a first substrate, a second substrate, and a liquid crystal layer disposed between the first substrate and the second substrate. The first substrate includes a first base and a planarization layer, and the planarization layer is arranged on the side of the first base adjacent to the liquid crystal layer. The side of the planarization layer adjacent to the liquid crystal layer is provided with a textured structure. The textured structure includes at least one groove path. The first substrate further includes a bottom edge. The extending direction of the groove path forms an included angle with the bottom edge, and the included angle is greater than or equal to 45 degrees and less than or equal to 135 degrees. The liquid crystal material in the liquid crystal layer diffuses along the extending direction of the groove paths through the groove paths based on a capillary phenomenon.

Optionally, the textured structure includes a plurality of groove paths arranged in parallel. The groove path is a groove formed by the surface of the planarization layer adjacent to the liquid crystal layer curving inwards. The width of the groove path is less than or equal to the depth of the groove path. The included angle between the extending direction of the groove path and the bottom edge is 90 degrees.

Optionally, the display panel further includes a sealant, and the sealant is arranged around the liquid crystal layer. In the extending direction of the groove path, both ends of the groove path do not exceed the region where the sealant is located.

Optionally, the textured structure includes at least two raised structures. The raised structures are elongated. The raised structures are arranged on the surface of the planarization layer adjacent to the liquid crystal layer. One groove path is formed between two adjacent raised structures. The length direction of the raised structure is parallel to the extending direction of the groove path. The width of the groove path is less than or equal to the thickness of the raised structure in a direction perpendicular to the first base.

Optionally, the textured structure includes a plurality of raised structures. The plurality of raised structures are evenly spaced and arranged in parallel. One groove path is formed between every two adjacent raised structures. Each of the raised structures extends from the sealant near the bottom edge to the sealant away from the bottom edge. The included angle between the extending direction of the groove path and the bottom edge is 90 degrees.

Optionally, each of the raised structures includes a plurality of segments of equal length, and the plurality of segments are arranged at intervals in a strip shape.

Optionally, the first substrate further includes a plurality of filter units and a black filter layer. The plurality of filter units and the black filter layer are arranged in the same layer, and are located between the first base and the planarization layer. The plurality of filter unit are arranged in array. Two adjacent filter units are separated by the black filter layer. The plurality of segments are respectively arranged corresponding to the filter units, and the number of the segments corresponding to each of the filter units is equal.

Optionally, the segments are each in a "Y" shape, and the head of each "Y"-shaped segment faces away from the bottom edge.

Optionally, the textured structure includes multiple groups of raised structures. The plurality of groups of raised structures are arranged on the surface of the planarization layer adjacent to the liquid crystal layer. The plurality of groups of raised structures are arranged in sequence from the bottom edge in a direction perpendicular to the bottom edge. Each group of raised structures includes a plurality of raised structures that are arranged at intervals along the direction of the bottom edge. The raised structure is "Y" shape or "I" shape. A groove path is formed between every two adjacent raised structures. Starting from bottom edge and along the extending direction of the groove path, the number of the raised structures in each group of raised structures gradually increases, and the number of the groove paths in each group of raised structures gradually increases, and the spacing of the groove paths in each group of raised structures gradually decreases.

The present application further discloses a display device, including a driving circuit and the above-mentioned display panel, wherein the driving circuit drives the display panel to display.

In the present application, a textured structure is disposed on the planarization layer, and the textured structure includes at least one groove path. When the display panel is placed vertically, the bottom edge of the first substrate is located at the lowermost end. The liquid crystal material in the liquid crystal layer sinks under the action of gravity. However, at the groove path position, due to the wetting phenomenon between the groove path and the liquid crystal material, the liquid level in the groove is concave, and the resultant force of surface tension is pointing upward. That is, the liquid crystal material climbs up along the textured structure under the action of surface tension. When the upward pulling force is equal to the gravity of the liquid crystal material in the groove path, the liquid crystal molecular material stops moving upward. The extending direction of the corresponding groove path forms an angle with the bottom edge. When the included angle is greater than or equal to 45 degrees and less than or equal to 135 degrees, the liquid crystal material in the groove path has a pulling force component perpendicular to the bottom edge and parallel to the direction of gravity. This embodiment mainly reduces the influence of gravity through the effect of surface tension on the liquid crystal material, so that the liquid crystal is distributed more evenly in the cell, thereby improving the gravitational mura phenomenon, and also has a certain improvement effect on the peripheral Mura, etc., so that the display of the display panel is more uniform and the quality of the display panel is higher.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

Figure 1:
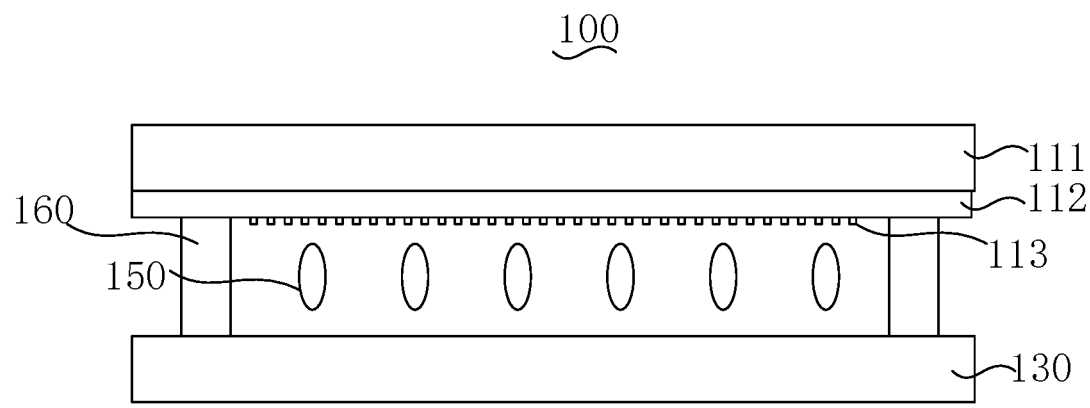
FIG. 1 is a schematic cross-sectional view of a display panel according to a first embodiment of the present application.

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "plurality" means two or more. The terms "including", "comprising", and any variations thereof are intended to mean a non-exclusive inclusion, namely one or more other features, integers, steps, operations, units, components and/or combinations thereof may be present or added. In addition, "above", "on", "under", "below", "bottom", etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation. Thus, these terms should not be construed as limiting the present application. For those having ordinary skill in the art, the specific meanings of the above terms in this application can be understood depending on specific contexts.

The present application will be described in detail below with reference to the accompanying drawings and optional embodiments.

Figure 2:
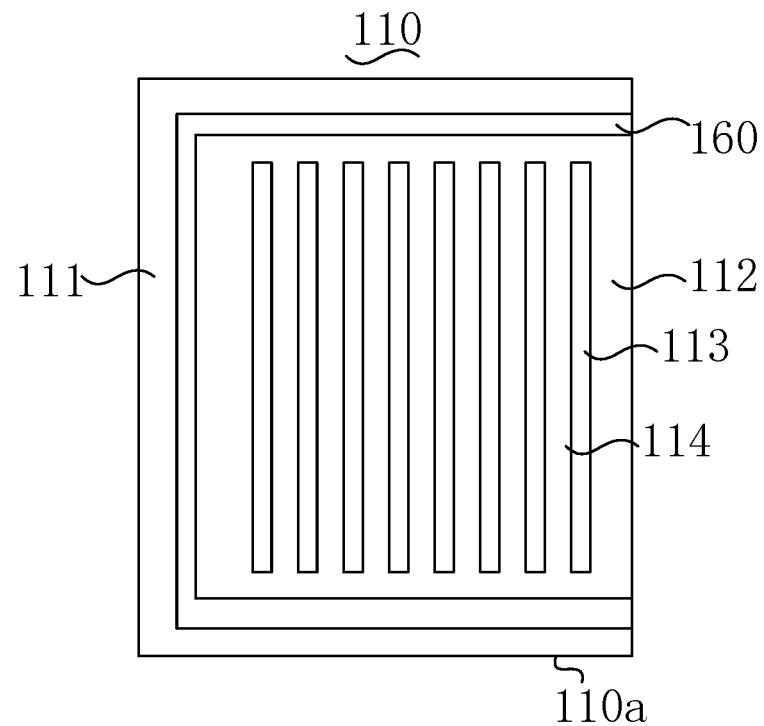
FIG. 2 is a schematic top view of a first substrate according to the first embodiment of the present application.

FIG. 1 is a schematic cross-sectional view of a display panel according to a first embodiment of the present application. FIG. 2 is a schematic top view of a first substrate according to the first embodiment of the present application. As shown in FIGS. 1-2, this embodiment discloses a display panel 100. The display panel 100 includes a first substrate 110, a second substrate 130 and a liquid crystal layer 150 disposed between the first substrate 110 and the second substrate 130. The first substrate 110 includes a first base 111 and a planarization layer 112. The planarization layer 112 is disposed on the side of the first base 111 adjacent to the liquid crystal layer 150.

The side of the planarization layer 112 adjacent to the liquid crystal layer 150 is provided with a textured structure. The textured structure includes at least one groove path 114. The first substrate 110 further includes a bottom edge 110a. The extending direction of the groove path 114 forms an included angle with the bottom edge 110a, and the included angle is greater than or equal to 45 degrees and less than or equal to 135 degrees. The liquid crystal material in the liquid crystal layer 150 climbs upward from the groove paths 114 along the extending direction of the groove paths 114 by principle of a capillary phenomenon.

In the present application, a textured structure is provided on the planarization layer, and the textured structure includes at least one groove path. When the display panel is placed vertically, the bottom edge of the first substrate is located at the lowermost end. The liquid crystal material in the liquid crystal layer sinks under the action of gravity. However, at the groove path position, due to the wetting phenomenon between the groove path and the liquid crystal material, the liquid level in the groove is concave, and the resultant force of surface tension is pointing upward. That is, the liquid crystal material climbs up along the textured structure under the action of surface tension. When the upward pulling force is equal to the gravity of the liquid crystal material in the groove path, the liquid crystal molecular material stops moving upward. The extending direction of the corresponding groove path forms an angle with the bottom edge. When the included angle is greater than or equal to 45 degrees and less than or equal to 135 degrees, the liquid crystal material in the groove path has a pulling force component perpendicular to the bottom edge and parallel to the direction of gravity. This embodiment mainly reduces the influence of gravity through the effect of surface tension on the liquid crystal material, so that the liquid crystal is distributed more evenly in the cell, thereby improving the gravitational mura phenomenon, and also has a certain improvement effect on the peripheral Mura, etc., so that the display panel 100 displays more uniformly, and the quality of the display panel 100 is superior.

It should be noted that the bottom edge 110a of the first substrate 110 as defined in this application refers to the lowest bottom edge 110a when the display panel 100 is vertically placed for display. Correspondingly, due to the problem of gravitational mura, the liquid crystal material in the liquid crystal layer 150 is easy to accumulate near the bottom edge 110a. In the present application, a textured structure is arranged on the planarization layer 112, so that the surface tension of the liquid crystal material can resist gravity and prevent the liquid crystal material from accumulating near the bottom edge 110a. In addition, the grooves in the groove path are similar to a slit with only one side open, and the liquid crystal material further produces a capillary phenomenon in the groove path. Furthermore, the extending direction of the groove path forms an included angle with the bottom edge, and the included angle is greater than or equal to 45 degrees and less than or equal to 135 degrees. The resistance to gravity mainly relies on the pulling force parallel to the direction of gravity. The smaller the angle between the extending direction of the groove path and the bottom edge, the closer the extending direction of the groove path is to the bottom edge, and the smaller the corresponding pulling force component parallel to the direction of gravity will be. The more perpendicular the extending direction of the groove path is to the bottom edge, the greater the pulling force component parallel to the direction of gravity will be, thereby generating a stronger pulling force to prevent the liquid crystal from sinking due to gravity. Therefore, in this embodiment, for the extending direction of the groove path to form an included angle with the bottom edge, the included angle is greater than or equal to 45 degrees, and less than or equal to 135 degrees, the effect is superior. In some embodiments, the included angle between the extending direction of the groove path and the bottom edge is 90 degrees.

Specifically, the textured structure includes at least two raised structures 113. The raised structures 113 are elongated. The raised structures 113 are disposed on the surface of the planarization layer 112 adjacent to the liquid crystal layer. One groove path 114 is formed between two adjacent raised structures 113. The length direction of the raised structures 113 is parallel to the extending direction of the groove paths 114. The width of the groove path 114 is less than or equal to the thickness of the raised structure 113 in the direction perpendicular to the first base 111. The width of the groove path 114 in this embodiment is the distance between the two raised structures 113. The width of the groove path 114 is related to the thickness of the raised structure 113. When the width of the groove path 114 is less than or equal to the thickness of the raised structure 113, it is further ensured that the groove path 114 has a certain inner radius, so as to satisfy the condition of capillary phenomenon, so that the liquid level of the infiltrating liquid in the capillary (groove path 114) is concave. It exerts a pulling force on the liquid below, causing the liquid to rise along the tube wall. When the upward pulling force is equal to the gravity of the liquid column in the tube, the liquid in the tube stops rising and reaches equilibrium. The thickness of the raised structures 113 may be lower than the height of the spacers 161 in the display panel 100. This is intended to prevent the film layer of the raised structures 113 from being damaged due to the excessive thickness.

According to the capillary phenomenon, the narrower the pitch of the groove paths 114 is, the stronger the pulling force on the liquid crystal material is. Therefore, for the present embodiment, the narrower the pitch of the groove paths 114 is, the better the effect of preventing gravitational mura is. From another point of view, more raised structures 113 can be provided to form more groove paths 114, thereby enhancing the ability to prevent gravitational mura.

As shown in FIG. 2, the textured structure includes a plurality of raised structures 113. The plurality of raised structures 113 are evenly spaced and arranged in parallel. The groove path 114 is formed between each raised structure 113 and an adjacent raised structure 113. The plurality of raised structures 113 are evenly arranged, thereby forming a plurality of groove paths 114, and the groove paths 114 are evenly arranged to form greater tension. Furthermore, the plurality of groove paths 114 are correspondingly arranged in the area where the liquid crystal layer 150 is located, so as to improve the problem of gravitational mura.

The display panel 100 further includes a sealant 160, and the sealant 160 is disposed around the liquid crystal layer 150. In the extending direction of the groove path 114, both ends of the raised structure 113 do not exceed the area where the sealant 160 is located. The raised structures 113 in this embodiment are arranged corresponding to the area where the liquid crystal layer 150 is located, and are not provided corresponding to the area where the sealant 160 is located. For the region of the sealant 160, if a pattern is provided on the planarization layer 112, it is likely to cause the problem that the sealant 160 cannot seal the liquid crystal layer 150. Therefore, in this embodiment, the raised structures 113 are only disposed corresponding to the region where the liquid crystal layer 150 is located, and both ends of the raised structures 113 do not exceed the region where the sealant 160 is located.

Specifically, each of the raised structures 113 extends from the sealant 160 adjacent to the bottom edge 110a to the sealant 160 far from the bottom edge 110a, and the included angle between the extending direction of the groove path and the bottom edge is 90 degrees. In this embodiment, each single raised structure 113 is not arranged intermittently, and there is a whole continuous raised structure 113 extending from the sealant 160 adjacent to the bottom edge 110a to the sealant 160 far away from the bottom edge 110a. Therefore, the groove path 114 in this embodiment extends from bottom to top to form a long groove path 114, so that the area of the groove path 114 is larger, and the wetting effect between the liquid crystal material and the groove path 114 is more obvious, and the tension is greater, and when the display panel 100 is placed vertically, the effect of preventing the gravitational mura problem is better.

The formation of the raised structures 113 in this embodiment is, specifically, before the pre-baking process of the planarization layer 112, the corresponding pattern can be printed on the planarization layer 112 by using a template of the corresponding pattern. There are two specific printing methods. One is to form the plurality of raised structures 113 on the side of the planarization layer 112 adjacent to the second substrate 130. Taking the above raised structures as an example, groove paths are formed between the raised structures. The second is to form the plurality of groove paths 114 on the side of the planarization layer 112 adjacent to the second substrate 130. Correspondingly, the textured structure includes a plurality of groove paths arranged in parallel. The groove path is a groove formed by the surface of the planarization layer adjacent to the liquid crystal layer curving inwards. The width of the groove path is less than or equal to the depth of the groove path. The included angle between the extending direction of the groove path and the bottom edge is 90 degrees. Both methods are workable and can be chosen depending on the actual application. The planarization layer is also known as the over coater layer. The planarization layer 112 may be formed of a resin material. In this embodiment, in order to further strengthen the wetting phenomenon between the liquid crystal material and the planarization layer 112, a wettable transparent resin may also be added to the material of the planarization layer 112. For example, the main content of the planarization layer 112 includes a main body of epoxy resin (epoxy) and a macromolecule containing acryl group (acryl).

Figure 3:
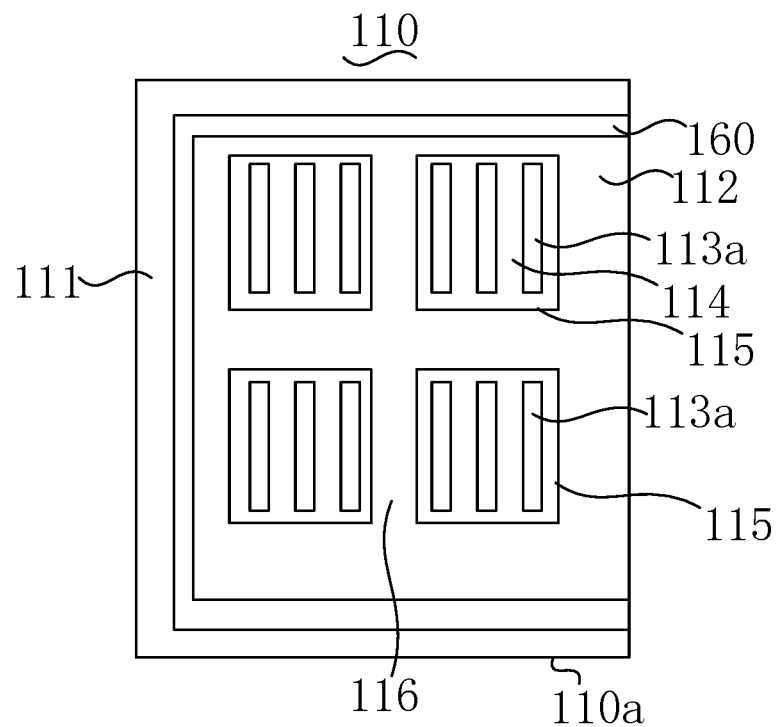
FIG. 3 is a schematic top view of a first substrate according to a second embodiment of the present application.
Figure 4:
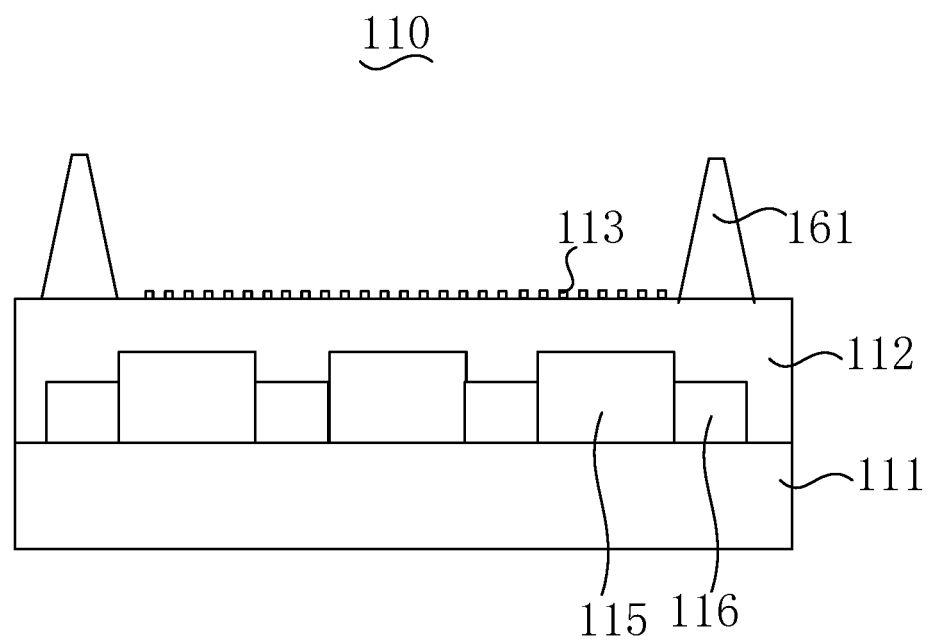
FIG. 4 is a schematic cross-sectional view of the first substrate according to the second embodiment of the present application.

FIG. 3 is a schematic top view of a first substrate according to a second embodiment of the present application. FIG. 4 is a schematic cross-sectional view of the first substrate according to the second embodiment of the present application. As shown in FIGS. 3-4, each of the raised structures 113 includes a plurality of segments 113a of equal length, and the plurality of segments 113a are arranged at intervals in a strip shape. In this embodiment, it is further contemplated that multiple spacers 161 are further disposed between the first substrate 110 and the second substrate 130. The function of the spacer 161 is mainly to support the first substrate 110 and the second substrate 130 and maintain the cell thickness. The corresponding spacers 161 are also disposed on the planarization layer 112, therefore, a space needs to be reserved on the planarization layer 112 for disposing the spacers 161.

Specifically, the first substrate 110 further includes a plurality of filter units 115 and a black filter layer 116. The plurality of filter units 115 and the black filter layer 116 are disposed in the same layer, and are located between the first base 111 and the planarization layer 112. The plurality of filter units 115 are arranged in an array, and two adjacent filter units 115 are separated by one black filter layer 116. The plurality of segments 113a are respectively disposed corresponding to the filter units 115, and the number of the segments 113a corresponding to each of the filter units 115 is equal. The corresponding spacers 161 are each disposed corresponding to the black filter layer 116. In this embodiment, the segments 113a are set corresponding to the filter units 115, and the number of segments 113a corresponding to each filter unit 115 is the same. When the display panel 100 displays, there will not be a problem that the number of the raised structures 113 corresponding to the different filter units 115 is different, resulting in a difference in the light diffusion. In addition, the planarization layer 112 is a transparent film layer, and the raised structure 113 is created on the transparent film layer, the influence of which on the light can be safely ignored. The main purpose of the uniform arrangement is to make the display effect better and more uniform. It should be noted that the first substrate 110 is a color filter substrate, and the second substrate 130 is an array substrate. The color filter substrate may include a plurality of filter units 115, and the plurality of filter units 115 may include a red filter unit 115, a green filter unit 115 and a blue filter unit 115. The adjacent red filter unit 115, green filter unit 115 and blue filter unit 115 form a pixel.

In a specific implementation of this embodiment, the spacer 161 is disposed between two filter units 115 arranged horizontally, and no spacer 161 is arranged between two adjacent filter units 115 arranged vertically to prevent the spacers 161 provided on the upper and lower sides of the groove path 114 from affecting the tension of the capillary phenomenon.

The segment 113a in this embodiment is "I"-shaped, and two adjacent "I"-shaped segments 113a form a capillary. The narrower the gap, the stronger the pulling force on the liquid crystal. When the screen is placed vertically, the liquid crystal molecules are subject to surface tension and climb up along the raised capillary walls. When the upward pulling force is equal to the gravity of the liquid on the tube wall, the liquid crystal stops moving upward, thereby reducing the influence of gravity.

In another modified embodiment, the plurality of segments 113a may also be arranged corresponding to the black filter layer 116. That is, a part of the segment 113a is arranged corresponding to the filter unit 115, and another part of the segment 113a is arranged corresponding to the black filter layer 116. In the direction of gravity, a spacer 161 are arranged between adjacent segments 113a. Compared with the previous embodiment, the number of groove paths 114 formed in this embodiment is greater, thereby achieving the effect of stronger capillary phenomenon.

Figure 5:
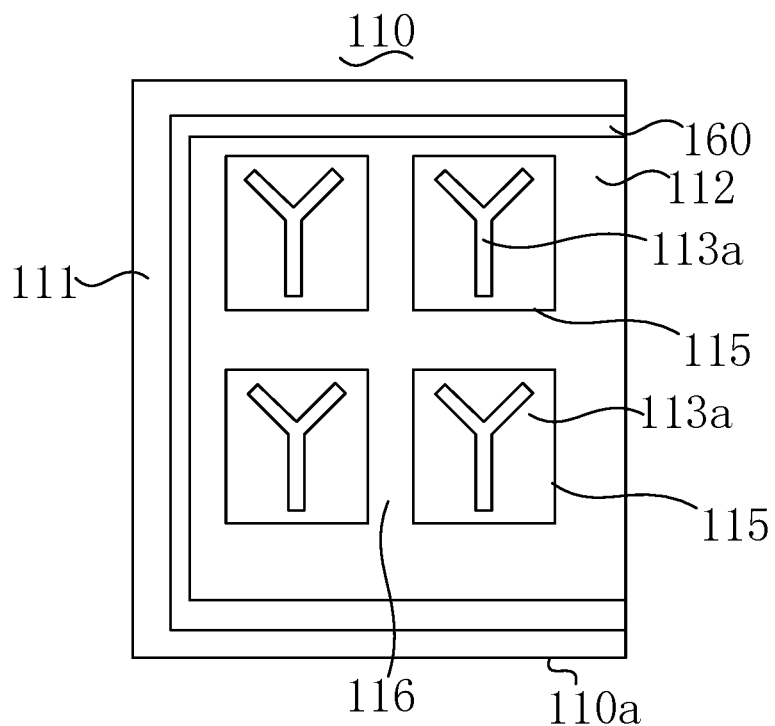
FIG. 5 is a schematic diagram of a second type of the first substrate according to the second embodiment of the present application.

FIG. 5 is a schematic diagram of a second type of the first substrate according to the second embodiment of the present application. As shown in FIG. 5, the segments 113a are "Y"-shaped, and the head of each "Y"-shaped segment 113a is faces away from the bottom edge 110a. Due to the "V-groove" at the upper end of the "Y"-shaped segment 113a, its function is equivalent to adding a "fence" to prevent the downward flow of liquid crystal on the basis of the "I"-shaped segment 113a, and the mechanism of capillary action is the same as the above.

Figure 6:
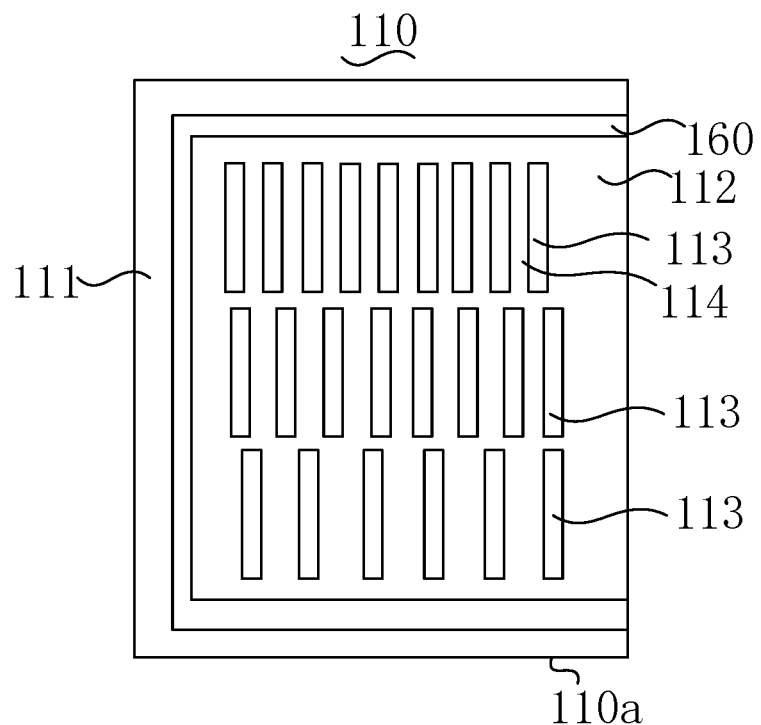
FIG. 6 is a schematic diagram of a first substrate according to a third embodiment of the present application.

FIG. 6 is a schematic diagram of a first substrate according to a third embodiment of the present application. As shown in FIG. 6, the textured structure includes multiple groups of raised structures 113, and multiple groups of the raised structures 113 are disposed on the surface of the planarization layer adjacent to the liquid crystal layer. The plurality of groups of raised structures 113 are arranged in sequence from the bottom edge 110a along a direction perpendicular to the bottom edge 110a. Each group of raised structures 113 includes a plurality of raised structures 113 that are sequentially spaced along the direction of the bottom edge 110a. The raised structure 113 is in the shape of "Y" or "I". A groove path is formed between every two adjacent raised structures. Starting from the bottom edge 110a along the extending direction of the groove path 114, the number of the raised structures 113 in each group of raised structures 113 gradually increases, and the spacing between the groove paths 114 in each group of the raised structures 113 gradually decreases.

The difference between this embodiment and the above-mentioned embodiment is that the number of groove paths 114 in different regions is different, and the number of groove paths 114 keeps increasing in the direction of starting from the bottom edge 110a and extending along the direction perpendicular to the bottom edge 110a. Correspondingly, the closer to the top of the display panel 100, the greater the number of groove paths 114, the closer to the top of the display panel 100, the greater the greater the tension effect to overcome gravity, thus preventing the liquid crystal material above the display panel 100 from being squeezed downward, and gradually solving the problem of downward pressing of the liquid crystal material from the upper part of the display panel 100, thereby overcoming the gravitational mura.

Of course, this application can also be combined with other designs to jointly improve the problem of gravitational mura.

For example, the number of spacers 161 may be gradually decreased starting from the bottom edge 110a along the direction perpendicular to the bottom edge 110a, that is, the closer to the bottom edge 110a of the first substrate 110, the greater the number of spacers 161. The lower the spacer 161 is on the display panel 100, the greater the force it bears. The greater the number of spacers 161, the more the gravity of the liquid crystal material can be dispersed, which combined with the capillary phenomenon of the groove path 114 makes the liquid pressure on the upper part of the display panel 100 equal to the liquid pressure on the lower part of the display panel 100, thereby improving the gravitational mura problem.

For example, by changing the cell thickness of the display panel 100, the cell thickness of the upper part of the display panel 100 is smaller, while the cell thickness of the lower part of the display panel 100 (i.e., the side near the bottom edge 110a) is larger, which combined with the capillary phenomenon, makes the liquid pressure on the upper part of the display panel 100 be equal to the liquid pressure on the lower part of the display panel 100, thereby improving the gravitational mura problem.

Figure 7:
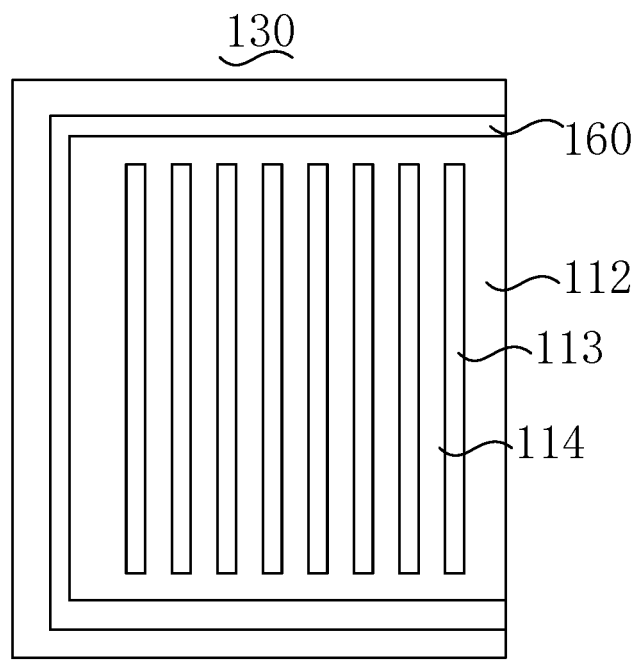
FIG. 7 is a schematic diagram of a second substrate of the third embodiment of the present application.

FIG. 7 is a schematic diagram of a second substrate of a third embodiment of the present application. As shown in FIG. 7, the second substrate 130 sequentially includes various film layers such as a substrate, a metal layer, and an insulating layer. The planarization layer 112 mentioned in the above embodiment is also disposed on the side of the second substrate 130 closest to the liquid crystal layer 150, and the same texture is formed on the planarization layer 112. The specific design can refer to the above-mentioned embodiment. This embodiment can also be combined with any one of the first substrates 110 in the second embodiment and the first embodiment to jointly realize the goal of preventing gravitational mura problem.

Figure 8:
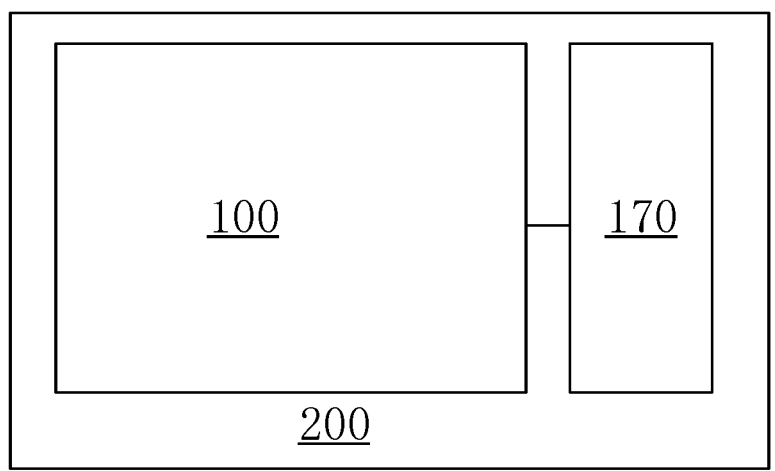
FIG. 8 is a schematic diagram of a display device according to a fourth embodiment of the present application.

FIG. 8 is a schematic diagram of a display device according to a fourth embodiment of the present application. As shown in FIG. 8, the present application further discloses a display device. The display device 200 includes a driving circuit 170 and the above-mentioned display panel 100. The driving circuit 170 drives the display panel 100 to display. In the present application, a textured structure is arranged on the planarization layer, taking two raised structures as an example, a groove path (slit) is formed between two adjacent raised structures. When the display panel is placed vertically, the bottom edge of the first substrate is located at the lowermost end, and the direction of the corresponding slit is perpendicular to the bottom edge and parallel to the direction of gravity. The liquid crystal material in the liquid crystal layer will sink under the action of gravity, but at the position of the slit, due to the wetting phenomenon between the raised structure and the liquid crystal material, the liquid level in the slit is concave, and the resultant force of the surface tension is upward. That is, the liquid crystal material climbs up along the textured structure under the action of surface tension. When the upward pulling force is equal to the gravity of the liquid crystal material in the slit, the liquid crystal material stops moving upward. This embodiment mainly reduces the influence of gravity through the effect of surface tension on the liquid crystal material, so that the liquid crystal is distributed more evenly in the cell, thereby improving the gravitational mura phenomenon, and also has a certain improvement effect on the peripheral Mura, etc., so that the display of the display panel is more uniform and the quality of the display panel is higher.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, the above solutions are also applicable to other types of display panels, such as OLED (Organic Light-Emitting Diode) display panels.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:
1. A display panel comprising a first substrate, a second substrate, and a liquid crystal layer disposed between the first substrate and the second substrate;
wherein the first substrate comprises a first base and a planarization layer disposed on a side of the first substrate adjacent to the liquid crystal layer;
wherein a side of the planarization layer adjacent to the liquid crystal layer comprises a textured structure, the textured structure comprising at least one groove path;
wherein the first substrate further comprises a bottom edge, wherein the bottom edge is a lower edge of the first substrate when the first substrate is placed vertically; an extending direction of the at least one groove path forms an included angle with the bottom edge, the included angle being greater than or equal to 45 degrees and less than or equal to 135 degrees, wherein the extending direction of the at least one groove path runs parallel to the first substrate;
wherein a liquid crystal material in the liquid crystal layer is operative to diffuse through the at least one groove path along an extending direction of the at least one groove path based on a capillary phenomenon;
wherein the textured structure comprises a plurality of groove paths arranged in parallel, the plurality of groove paths being created by curving inwards of a surface of the planarization layer adjacent to the liquid crystal layer;

wherein a width of each of the plurality of groove paths is less than or equal to a depth of the groove path, and an included angle between the extending direction of the groove path and the bottom edge is 90 degrees.

2. The display panel as recited in claim 1, further comprising a sealant disposed around the liquid crystal layer, and wherein in the extending direction of the at least one groove path, both ends of the at least one groove path each do not exceed a region where the sealant is disposed.

3. The display panel as recited in claim 1, wherein a cell thickness of the display panel at a side adjacent to the bottom edge is greater than a cell thickness of the display panel at a side facing away from the bottom edge.

4. The display panel as recited in claim 1, wherein there is further arranged a planarization layer on a side of the second substrate adjacent to the liquid crystal layer.

5. A display panel comprising a first substrate, a second substrate, and a liquid crystal layer disposed between the first substrate and the second substrate;

wherein the first substrate comprises a first base and a planarization layer disposed on a side of the first substrate adjacent to the liquid crystal layer;

wherein a side of the planarization layer adjacent to the liquid crystal layer comprises a textured structure, the textured structure comprising at least one groove path;

wherein the first substrate further comprises a bottom edge, wherein the bottom edge of the first substrate is a lower edge of the first substrate when the first substrate is placed vertically; an extending direction of the at least one groove path forms an included angle with the bottom edge, the included angle being greater than or equal to 45 degrees and less than or equal to 135 degrees, wherein the extending direction of the at least one groove path runs parallel to the first substrate;

wherein each of the at least one groove path has a width greater than a depth thereof;

wherein a liquid crystal material in the liquid crystal layer is operative to diffuse through the at least one groove path along an extending direction of the at least one groove path based on a capillary phenomenon;

wherein the textured structure comprises a plurality of groups of raised structures arranged on a surface of the planarization layer adjacent to the liquid crystal layer; wherein the plurality of groups of raised structures are arranged in sequence starting from the bottom edge of the first substrate in a direction perpendicular to the bottom edge and along a surface of the first substrate;

wherein each group of raised structures comprises a plurality of raised structures spaced in sequence along the direction of the bottom edge, wherein the raised structures are each "Y" shaped, and wherein a respective groove path is defined between every two adjacent raised structures.

6. The display panel as recited in claim 5, wherein starting from the bottom edge of the first substrate along the extending direction of the at least one groove path, a number of the raised structures in each group of raised structures gradually increases, a number of the groove paths in each group of raised structures gradually increases, and a spacing of the groove paths in each group of raised structures gradually decreases.

7. A display device, comprising a driving circuit and a display panel, wherein the driving circuit is configured to drive the display panel to display; wherein the display panel comprises a first substrate, a second substrate, and a liquid crystal layer disposed between the first substrate and the second substrate;

wherein the first substrate comprises a first base and a planarization layer disposed on a side of the first substrate adjacent to the liquid crystal layer;

wherein a side of the planarization layer adjacent to the liquid crystal layer comprises a textured structure, the textured structure comprising at least one groove path;

wherein the first substrate further comprises a bottom edge, wherein the bottom edge is a lower edge of the first substrate when the first substrate is placed vertically; an extending direction of the at least one groove path forms an included angle with the bottom edge, the included angle being greater than or equal to 45 degrees and less than or equal to 135 degrees, wherein the extending direction of the at least one groove path runs parallel to the first substrate;

wherein a liquid crystal material in the liquid crystal layer is operative to diffuse through the at least one groove path along an extending direction of the at least one groove path based on a capillary phenomenon;

wherein the textured structure comprises a plurality of groove paths arranged in parallel, the plurality of groove paths being created by curving inwards of a surface of the planarization layer adjacent to the liquid crystal layer;

wherein a width of each of the plurality of groove paths is less than or equal to a depth of the groove path, and an included angle between the extending direction of the groove path and the bottom edge is 90 degrees.

8. The display device as recited in claim 7, wherein the display panel further comprises a sealant disposed around the liquid crystal layer, and wherein in the extending direction of the at least one groove path, both ends of the at least one groove path each do not exceed a region where the sealant is disposed.

\* \* \* \* \*